United States Patent

Bruneau et al.

[11] Patent Number: 6,107,444
[45] Date of Patent: Aug. 22, 2000

[54] THERMOPLASTIC COMPOSITION BASED ON A TRANSPARENT THERMOPLASTIC (CO) POLYMER CONTAINING POLYAMIDE PARTICLES WHICH CAN BE USED FOR LIGHT-SCATTERING SHAPED ARTICLES

[75] Inventors: Jean-Michel Bruneau; Jacques Magne, both of Gisors; Eric Perraud, Courdimanche; Xavier Marcarian, Jurancon, all of France

[73] Assignee: Elf Atochem S.A., France

[21] Appl. No.: 09/350,141

[22] Filed: Jul. 9, 1999

Related U.S. Application Data

[63] Continuation of application No. 09/095,592, Jun. 11, 1998.

[30] Foreign Application Priority Data

Jul. 25, 1997 [FR] France .................................. 97/09498

[51] Int. Cl.$^7$ .................................................. C08G 63/00
[52] U.S. Cl. ........................... 528/272; 528/176; 528/196
[58] Field of Search ..................... 528/176, 196, 528/272; 525/433, 434

[56] References Cited

U.S. PATENT DOCUMENTS

| | | | |
|---|---|---|---|
| 4,007,141 | 2/1977 | Wismer et al. | 428/402.24 |
| 4,572,869 | 2/1986 | Wismer et al. | 428/402.24 |
| 5,026,592 | 6/1991 | Jonacha et al. | 428/204 |
| 5,137,790 | 8/1992 | Cox et al. | 428/475.2 |
| 5,258,233 | 11/1993 | Mills et al. | 428/480 |
| 5,340,884 | 8/1994 | Mills et al. | 125/420 |

FOREIGN PATENT DOCUMENTS

| | | |
|---|---|---|
| 0 043 288 | 1/1982 | European Pat. Off. . |
| 0 695 778 | 2/1996 | European Pat. Off. . |

OTHER PUBLICATIONS

Abstract, US5340884 (1994).
Patent Abstracts of Japan, vol. 018, No. 558, Abstract of JP 6–200092. (1994).
Patent Abstracts of Japan, vol. 014, No. 137, Abstract of JP 2–011649. (1990).
Derwent Pubs., Section Ch, Week 7536, Abstract of JP 49–60339 (1994).
Derwent Pubs. Abstract of JP 61–209154. (1986).

*Primary Examiner*—Terressa M. Boykin
*Attorney, Agent, or Firm*—Millen, White, Zelano & Branigan, P.C.

[57] ABSTRACT

A thermoplastic composition for a light-scattering shaped article comprises a transparent thermoplastic polymer, especially a (meth)acrylic (co)polymer and polyamide particles having an average size of from 0.4 to 200 μm. A sheet obtained from the composition can be used in light display devices.

38 Claims, No Drawings

THERMOPLASTIC COMPOSITION BASED ON A TRANSPARENT THERMOPLASTIC (CO) POLYMER CONTAINING POLYAMIDE PARTICLES WHICH CAN BE USED FOR LIGHT-SCATTERING SHAPED ARTICLES

This is a continuation of application Ser. No. 09/095,592 filed Jun. 11, 1998.

SUMMARY OF THE INVENTION

The invention relates to a composition made of a transparent thermoplastic comprising polyamide particles, which can be used for forming shaped articles, in particular sheets acting as a light guide and a light scatterer. These sheets can be used in particular for light display systems.

Light display systems are known and generally comprise, mounted in a suitable frame, an assembly comprising a sheet or panel made of a transparent plastic containing particles of a material which can scatter light.

The light source, generally fluorescent tubes, may be near one face of the thermoplastic panel and the light transmitted directly and that scattered by the particles contained in the panel are observed via the opposite face. In this case, the thermoplastic panel contains a large quantity of scattering particles in order to make it sufficiently opaque to mask the light source. The panel is integrated into a box containing the fluorescent tubes. There must be a sufficient number of these tubes to ensure good distribution of the light intensity. This box has the drawback of being thick and this device consumes a great deal of energy.

The light source may also be near one of the edges of the panel so as to illuminate it via the edge (or end face). The panel then operates as a light guide. The light is therefore reflected and scattered by the scattering particles contained in the panel and some of the scattered light is observed through one face or both faces of the panel. If the panel contains a large quantity of scattering particles, the optical path followed by the light is short and part of the surface will not be illuminated or will be poorly illuminated.

If the panel contains few scattering particles, the intensity of the scattered light is low.

The scattered light intensity decreases as a function of the distance from the light source.

Attempts have therefore been made to find compositions made of a transparent thermoplastic which can be molded into shaped articles, in particular in the form of sheets which can be used, for example, as panels for light-display devices, which, containing a minimum of scattering particles, allow a maximum scattered light intensity which is uniform over the entire surface of the shaped article.

The thermoplastic composition according to the invention, for a light-scattering shaped article, comprises a transparent thermoplastic and, with respect to the total composition, from 20 ppm to 1000 ppm of polyamide particles of an average size of from 0.4 $\mu$m to 200 $\mu$m.

The thermoplastic may, for example, be a (meth)acrylic (co)polymer, polycarbonate, polystyrene, polyethylene terephthalate, copolyesters consisting of polyethylene terephthalate modified by a glycol, such as diethylene glycol, butanediol, hexanediol and 1,4-cyclohexanedimethanol, or blends of polyethylene terephthalate and of these copolyesters.

The (meth)acrylic thermoplastic (co)polymer may, in particular, consist of an alkyl methacrylate homopolymer or of a copolymer derived from an alkyl methacrylate and from at least one monomer having one or more ethylenically unsaturated groups which is (are) copolymerizable with the alkyl methacrylate.

As alkyl methacrylate, mention may be made, in particular, of compounds in which the alkyl group has from 1 to 8 carbon atoms, for example, methyl methacrylate, ethyl methacrylate, propyl methacrylate isopropyl methacrylate and butyl methacrylate. A particularly preferred monomer is methyl methacrylate.

The (meth)acrylic thermoplastic (co)polymer preferably comprises from 70 to 100% by weight of a main monomer, the alkyl methacrylate, and from 0 to 30% by weight of one or more monomers having one or more ethylenically unsaturated groups which is (are) copolymerizable with the alkyl methacrylate. This (these) monomer(s) having one or more ethylenically unsaturated groups is (are) chosen, for example, from $C_1$–$C_8$ alkyl acrylates, styrene, substituted styrenes, acrylonitrile, methacrylonitrile, $C_1$–$C_8$ alkyl methacrylates differing from the main monomer, hydroxyalkyl acrylates and methacrylates, alkoxyalkyl or aryloxyalkyl acrylates and methacrylates in which the alkyl group has from 1 to 4 carbon atoms, acrylamide, methacrylamide, acrylic acid, methacrylic acid, maleimides and alkylene glycol dimethacrylates in which the alkylene group has from 1 to 4 carbon atoms.

The (meth)acrylic (co)polymers may be obtained by any known process, for example by suspension polymerization or bulk polymerization.

The composition according to the invention comprises polyamide particles which advantageously have an average size of between 0.4 and 100 $\mu$m, preferably 0.4 to 50 $\mu$m. Particles of average size of from 1 to 15 $\mu$m are particularly suitable.

Preferably, the polyamide particles have a narrow particle size distribution, that is to say that more than approximately 90% have a size of between 2.5 and 10 $\mu$m.

In particular, the composition contains from 100 to 200 ppm of polyamide particle.

As polyamides, it is possible to use those obtained from lactams, such as, for example, $\epsilon$-caprolactam, enantholactam, undecanolactam and lauryllactam, or from amino acids, the carbon chain of which has a number of carbon atoms of between 4 and 20, such as aminocaproic, 7-aminoheptanoic, 11-aminoundecanoic and 12-aminododecanoic acids. It is also possible to use products from the condensation of diamines such as hexamethylenediamine, dodecamethylenediamine, metaxylylenediamine, bis-(p-aminocyclohexyl)methane, trimethylhexamethylenediamine, etc. with dicarboxylic acids such as isophthalic, therephthalic, adipic, suberic, azelaic, sebacic, dodecanedioic and dodecanedicarboxylic acids; mention may be made, for example, of nylon-6,6, nylon-6,9, nylon-6,12 and nylon-6,6 which are products from the condensation of hexamethylenediamine with adipic acid, azelaic acid, sebacic acid and 1,12-dodecanedioic acid, or else the product of the reaction of nonamethylenediamine with adipic acid.

It is also possible to use mixtures of all these monomers, which leads to copolyamides.

Among these polyamides, mention may most particularly be made of nylon-6 obtained by the polymerization of $\epsilon$-caprolactam, nylon-11 obtained by the polycondensation of 11-aminoundecanoic acid and nylon-12 obtained by the polycondensation of 12-aminododecanoic acid or dodecanolactam.

The term "polyamide" is also understood to mean polyetheramides and polyetheresteramides.

The polyamides obtained in the form of granules may be converted into a powder of suitable size by known techniques, for example by grinding the granules or dissolving them hot in solvents and precipitating by cooling. It is also possible to obtain these polyamides directly in the form of powder by anionic polymerization of the monomer or monomers as described, for example, in Patents EP-1-192, 515 or EP B1-303,530. The polyamide powder obtained by the process described in EP-B1-303,530, which can be used in particular in the invention, consists of porous elementary particles of approximately spheroidal shape having an average diameter of between 1 and 20 µm and particularly between 2 and 10 µm.

Particularly suitable polyamides are those sold by Elf Atochem S.A. under the trade names Rilsan® and Orgasol®.

The composition according to the invention may contain standard additives such as colorants and fillers.

It may also be contained by blending (meth)acrylic (co) polymers with polyamides in any suitable device, for example in a mixer of the Brabender type, a single-screw or twin-screw extruder, etc.

The light-scattering shaped articles that may be manufactured from the thermoplastic composition described above may be obtained by various known moulding processes, in particular by extrusion moulding, injection moulding and compression moulding. Products in the form of sheets and moulded products of various shapes are therefore obtained.

The shaped articles may also be obtained directly in the form of sheets by the bulk polymerization of a mixture of (meth)acrylic monomers and, optionally, of their prepolymer, in the presence of the polyamide and of the other optional additives, in a mould formed by two glass plates (casting process).

For this bulk polymerization, it is possible to use any known free-radical initiator, for example diazo compounds, such as azo-bis-isobutyronitrile (AIBN), or peroxides, such as benzoyl peroxide. The polymerization generally takes place in the presence of a chain-transfer agent such as a di-unsaturated monocyclic terpenes, mono-unsaturated bicyclic terpenes, such as terpinolene, and mercaptans such as tert-dodecyl mercaptan.

It is also possible to add agents which promote the demolding of the sheets, for example stearic acid and sodium dioctyl sulphosuccinate.

The shaped articles according to the invention, particularly sheets, may also consist of a transparent thermoplastic material, such as those mentioned above, comprising a concentration of polyamide particles which varies over the entire thickness of the article, the highest concentration being in a region close to the scattering surface. This concentration difference in the thickness of the article may be gradual, being the form of a concentration gradient. This embodiment make it possible to increase the light transmission in the region of the article having the lowest concentration of polyamide particles and, consequently, a greater uniformity of the intensity of scatter light over the entire surface of the article, in particular in the regions remote from the light source.

The sheets obtained from compositions according to the invention are particularly useful for manufacturing panels for advertising light-display systems. If the panels are illuminated via the edge, they advantageously have a thickness of at least approximately 6 mm. However, scattering panels having a thickness of less than approximately 6 mm remain useful for particular applications. When the panels are illuminated via a face, their minimum thickness may be greater, for example from 8 to 15 mm.

It is also possible to manufacture panels for a light-display system which comprise, for example, a support made of a transparent thermoplastic material, such as polymethyl methacrylate, polystyrene, polycarbonate, polyethylene terephthalate or copolyesters consisting of polyethylene terephthalate modified by a glycol, and a scattering layer formed from the scattering thermoplastic composition described above. This product may be obtained by any suitable process, for example by coextrusion or coating with acrylic resin.

One embodiment of a light-display system comprising a panel consisting of a sheet obtained from a thermoplastic composition according to the invention is shown diagrammatically in FIG. 1.

The panel (1) is combined with at least one means forming the light source (2), such as a fluorescent tube, mounted so as to illuminate the panel via its edge.

In order to improve the uniformity of the scattered light, two light sources (2) are place along two opposite sides (end faces) of the panel. Advantageously, the end face (3) facing the light sources are polished beforehand in order to avoid reflection of the light emitted by the source.

The end faces not facing the light sources (not shown in FIG. 1) have a light-reflecting layer, for example a metal film such as an aluminium film carried, for example, by an adhesive support, such as the Scotch Brand type 850® product from 3M, or else a metal layer deposited, for example, by sputtering, optionally after pretreating the surface, as described in document EP-A-0,650,772.

The face (A) of the panel via which the scattered light is observed may have a light-scattering film or sheet (4) having a transmission coefficient which depends on the desired effect in order to further improve the uniformity of the scattered light. The transmission coefficient of this film or sheet is preferably greater than or equal to approximately 50%.

This film or sheet may consist of any suitable material; for example, this may be a polymer such as polymethyl methacrylate treated in or to obtain the desired transmission (such as Altuglas® Ref. 101.27019 sold by Atohaas Europe) or even a paper support having an adequate light transmission, or else it is the actual advertising display that is to be illuminated.

In order to obtain better reflection of the light, before scattering, the face (B) opposite that via which the scattered light is observed advantageously has an opaque film or sheet (5) formed by any suitable material, for example by polymethyl methacrylate treated in order to have a low transmission (such as Altuglas® Ref. 101.47005), a white vinyl chloride polymer, a white polyester or polyethylene.

This scattering film or sheet (4) or opaque film or sheet (5) may have a thickness which varies depending on the desired use. These various components described are assembled, without being adhesively bonded, or they may adhere to the panel by any suitable means.

According to an advantageous embodiment, allowing the intensity of the scattered light to be improved, the films (4) and/or (5) placed respectively on the face (A) and (B) are in the form of parallel adhesive strips having a width of a few millimeters to a few centimeters, for example about 0.5 to 20 mm, which may or may not be uniformly spaced apart by a distance of a few millimeters to a few centimeters (for example, 0.5 to 20 mm). The distance separating these strips may be equal to or greater than or less than the width of the strips. In particular, the distance separating these strips may be smaller as one goes further away from the light source. If the light source consists of fluorescent tubes, the adhesive strips are parallel to each other and to the tubes.

Preferably, only the face (B) carries a film (5) in the form of parallel strips. These strips adhere to the surface of the panel by any suitable means.

If the film (5) on the face (B) is in the form of strips, a film or sheet (5') is placed on this film (5) in order to avoid light losses.

In FIG. 1, the component 6 represents, by way of example, one possible information medium.

The following non-limiting examples illustrate the invention. In these examples, the mouldable thermoplastic consists of polymethyl methacrylate (PMMA). Panels useful in light-display devices, as indicated in the examples, are prepared.

The intensity of the scattered light is measured using an arrangement as shown in FIG. 2.

The scattered light intensity is evaluated using a LAP luxmeter, the cell (13) of which is placed on the surface of the panel at a distance of 5 cm and at a distance of 50 cm from the light source (11). This evaluation allows the uniformity of the light intensity over the entire surface of the panel to be determined.

EXAMPLES 1 AND 2

In each of the examples, a light-scattering panel is prepared using the process of bulk polymerization. A methyl methacrylate prepolymer is prepared by adding 20 ppm by weight of 2,2-azobis-isobutyronitrile catalyst to the methyl methacrylate monomer. The mixture is heated to 90° C. until a degree of conversion of about 7% is obtained.

This prepolymer is cooled and then the quantity (250 ppm) of the same catalyst necessary for polymerizing the entire monomer, 55 ppm of chain-transfer agent (terpinolene) and 150 ppm of ORGASOL 2001® polyamide powder (nylon-12) in the case of Example 1 and ORGASOL 3502® polyamide powder (nylon-6,12) in the case of Example 2, these polyamide powders being sold by Elf Atochem S.A., having an average size of 5 μm and 15 μm respectively, are added to the prepolymer. 100 ppm of a conventional mold-release agent, sodium dioctyl sulpho succinate are also added.

The mold is formed by two glass plates of size 1000×1000×8 mm which are separated at their periphery by a flexible polyvinyl chloride (PVC) seal, the diameter of which determines the thickness of the final sheet (8 mm). The two ends of the seal are held apart in order to allow the polymerizable composition to be introduced. These glass plates are held together using metal clamps.

The composition is put under vacuum for 30 minutes, in order remove the air, the composition is then introduced into the mold using a funnel placed between the two ends of the PVC seal, and then the mould is closed by bringing these two ends into contact with each other.

The mold is put into a ventilated oven in order to polymerize the methyl methacrylate. The temperature cycle consists in heating the mould at 55° C. for 600 minutes and then at 120° C. for 2 hours so as to ensure maximum conversion of at least 99%.

A sheet having a thickness of 8 mm is obtained.

This sheet is tested as indicated above, as the panel 7 in an arrangement such as that shown in FIG. 2.

The face (A) of the panel carries a scattering sheet (12) of 50% transmission having a thickness of 3 mm made of white, opal Altuglas®, Ref. 101.27019. This sheet simulates an advertising display to be illuminated by the scattered light.

The PMMA panel (7) caries, on the face (B), an opaque film (8) having a thickness of 150 μm and consisting of white polyvinyl chloride.

The end face (9), which does not face the light source, carries an aluminium reflecting film. The end face (10) of the panel facing the light source (11) is polished. The light source (11), place 1 mm from the surface of the end face (10), consists of a Mazda Fluor Symphonie Harmonia 950® fluorescent tube (36 W for a light flux of 2850 lumens).

With the Orgasol 2001 polymide (Example 1): the light intensity measured by the luxmeter at 5 cm from the light source is 180 lux. The light intensity at 50 cm from the light source is 170 lux.

With the Orgasol 3502 polyamide (Example 2): the light intensity at 5 cm is 160 lux; at 50 cm it is 150 lux.

It may be noted that the light intensity varies little between that part of the panel lying close to the light source and that lying at the end of the panel, which means that the light intensity is uniform over the entire surface of the panel.

It may also be pointed out that the panels according to the invention have an aesthetically pleasing slightly bluish-white hue. This hue is evaluated by measurements carried out using a Colorquest® integrating-sphere spectrocolorimeter, model 1200M50 from Hunterlab, which make it possible to determine the three parameters L*, a* and b* defined by the C.I.E. (International Committee on Illumination). They make it possible to define a colour with respect to white, grey and black standards. In particular, for the product containing Orgasol 2001 polyamide particles, the above 3 parameters measured on the light scattered by the panel under use conditions are, respectively, 2.2, +1.4 and −12.

EXAMPLES 3a to 3d

A PMMA sheet, prepared as in Examples 1 and 2, is used. It contains 150 ppm of ORGASOL 2001® polyamide in the form of powder having an average size of 5 μm. This sheet has a size of 300×420×8 mm. It is used as a panel in a light-display device as shown in FIG. 2. The light source (11) consists of an FM fluorescent tube from the company OSRAM, having a diameter of 7 mm and a length of 320 mm. The power consumed is 8 watts for a light flux of 50 lumens. The tube is place at 1 mm from the surface of the end face (10), along one long side. The end faces not illuminated are covered with a reflecting adhesive tape. All the end faces are polished.

The face (A) of the panel carries an opal white scattering sheet (12) made of ALTUGLAS® Ref. 101-27019 having a thickness of 3 mm, which serves to simulate an advertising display.

The face (B), opposite to that via which the scattered light is observed, carries a coating consisting of an adhesive film (8) made of white opaque polyvinyl chloride having a thickness of 80 μm, sold under the name white Scotchcal Electrocut by the company 3M (transmission=12%). This film is in a continuous form or in the form of mutually parallel strips.

The face (B) of the panel, provided with the adhesive film in continuous form or in the form of parallel strips, furthermore carries an opaque white sheet (8') of ALTUGLAS® Ref. 101-47005 having a thickness of 3 mm.

The light intensity scattered by the face (A) is measured, as indicated previously, using a LAP luxmeter, the cell of which is placed on the surface of the panel at various distances from the light source.

Table 1 give the scattered light intensities as a function of the distance from the light source, these being observed with several panels according to the invention which may or may not carry a white adhesive film. The white film is in a continuous form or in the form of strips which are parallel to each other and to the fluorescent tube. The panels are as follows:

panel (a)=panel without an adhesive film, panel (b)=panel carrying a continuous adhesive film, panel (c)=panel carrying the adhesive film in the form of parallel strips 2 mm in width and separated by a distance of 3 mm, panel (d)=panel carrying the adhesive film in the form of mutually parallel strips deposited in the following manner:

over a distance of 8 cm from the light source: adhesive strips 2 mm in width and separated by 8 mm, over a distance ranging from 8 cm to 17 cm from the light source: strips 2 mm in width separated by a distance of 3 mm, over a distance of 17 cm to 30 cm from the light source: continuous adhesive film.

TABLE 1

| Distance from the source (cm) | Sheet (a) | Sheet (b) | Sheet (c) | Sheet (d) |
| --- | --- | --- | --- | --- |
| 0 | 400 | 1600 | 700 | 550 |
| 2.5 | 170 | 1100 | 630 | 500 |
| 5 | 155 | 800 | 480 | 420 |
| 7.5 | 140 | 600 | 400 | 360 |
| 10 | 130 | 440 | 340 | 420 |
| 12.5 | 128 | 380 | 290 | 380 |
| 15 | 125 | 340 | 250 | 330 |
| 17.5 | 125 | 320 | 240 | 400 |
| 20 | 125 | 290 | 220 | 380 |
| 25 | 125 | 260 | 190 | 230 |
| 30 | 125 | 240 | 190 | 190 |

It may be noted that panel (b) (continuous film) is brighter than panel (a) (without an adhesive film), but the intensity of the scattered light is not very homogeneous.

With sheet (c)—carrying strips parallel to each other and to the fluorescent tube—the scattered light intensity is more homogeneous than that obtained with sheet (b).

With sheet (d), a more homogeneous light intensity than that obtained with sheet (c) is noted.

COMPARATIVE EXAMPLES 4a AND 4b

By way of comparison, the scattered light intensity is measured as a function of the distance from the light source of panels formed form Altuglas CN 100-10.000® (cast polymethyl methacrylate—PMMA—not containing polyamide particles). These panels are mounted in a light-display device as described in Examples 3b and 3c.

In Example 4a, the Altuglas CN 100-10.000 sheet or panel carries a continuous adhesive film identical to that used in Example 3b.

In Example 4b, the sheet carries an adhesive film in the form of parallel strips identical to that used in Example 3c.

Measuring the scattered light intensity at a distance of 15 cm and 30 cm from the light source gives the following results:

TABLE 2

| | Light intensity (lux) | |
| --- | --- | --- |
| Examples | at 15 cm | at 30 cm |
| 4a | 150 | 125 |
| 4b | 150 | 125 |
| 3b | 340 | 240 |
| 3c | 250 | 190 |

It may be noted that the sheets containing polyamide particles according to the invention have a higher scattered light intensity than that obtained with a PMMA sheet not containing polyamide particles.

The preceding examples can be repeated with similar success by substituting the generically or specifically described reactants and/or operating conditions of this invention for those used in the preceding examples.

The entire disclosure of all applications, patents and publications, cited above and below, and of corresponding French application No. 97/09498 are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermoplastic composition useable to produce a light-scattering shaped article comprising a transparent thermoplastic, wherein the composition contains, with respect to the total composition, 20 ppm to 1000 ppm of polyamide particles of average size of 0.4 $\mu$m to 200 $\mu$m.

2. A composition according to claim 1, wherein the transparent thermoplastic material is selected from a (meth) acrylic (co)polymer, polycarbonate, polystyrene, polyethylene, terephthalate, a copolyester consisting of polyethylene terephthalate modified by a glycol, or a blend of polyethylene terephthalate and copolyester.

3. A composition according to claim 2, comprising a (meth)acrylic thermoplastic (co)polymer which is a polyalkyl methacrylate or a copolymer of an alkyl methacrylate and of at least one monomer having one or more ethylenically unsaturated groups copolymerizable with the alkyl methacrylate.

4. A composition according to claim 3, wherein the thermoplastic (co)polymer contains 70 to 100% by weight of a main alkyl methacrylate monomer, and from 0 to 30% by weight of one or more monomers having one or more ethylenically unsaturated groups copolymerizable with the alkyl methacrylate.

5. A composition according to claim 4, wherein the monomers having one or more ethylenically unsaturated groups are $C_1$–$C_8$ alkyl acrylates, styrene, substituted styrenes, acrylonitrile, methacrylonitrile, $C_1$–$C_8$ alkyl methacrylates differing from the main monomer, $C_1$–$C_4$ alkoxyalkyl or $C_1$–$C_4$ aryloxyalkyl acrylates or methacrylates, acrylamide, methacrylamide, acrylic acid, methacrylic acid, maleimides or alkylene glycol dimethacrylates in which the alkylene group has 1 to 4 carbon atoms.

6. A composition according to claim 3, wherein the alkyl methacrylate has from 1 to 8 carbon atoms in the alkyl group.

7. A composition according to claim 6, wherein the alkyl methacrylate is methyl methacrylate, ethyl methacrylate, propyl methacrylate, isopropyl methacrylate or butyl methacrylate.

8. A composition according to claim 1, wherein the polyamide particles have an average size of 0.4 µ to 100 µm.

9. A composition according to claim 1, comprising from 100 to 200 ppm of polyamide particle.

10. A composition according to claim 1, comprising polyamide particles having a narrow particle size distribution, such that more than approximately 90% have a size between 2.5 and 10 microns.

11. A composition according to claim 1, wherein the polyamide is obtained from one or more lactams, one or more amino acids or mixtures of diamines and of diacids or from a mixture of these monomers.

12. A composition according to claim 11, wherein the polyamide is obtained from α-caprolactam, enantholactam, undecanolactam or lauryllactam.

13. A composition according to claim 11, wherein the polyamide is obtained from amino acids whose carbon chain contains from 4 to 20 carbons atoms, and preferably from aminocaproic, 7-aminoheptanoic, 11-aminoundecanoic and 12-aminododecanoic acids.

14. A composition according to claim 11, wherein the polyamide is derived from polycondensation of hexamethylenediamine, dodecane-methylenediamine, met-axylylenediamine bis-(p-aminocyclohexyl)methane and/or trimethylhexamethylene-diamine with one or more ispohthalic, terephthalic, adipic, suberic, azelaic, sebacic, dodecanedioic or dodecanedicarboxylic acids.

15. A composition according to claim 11, wherein the polyamide is nylon-6 obtained by the polymerization of ε-caprolactam, nylon-11 obtained by the polycondensation of 11-aminoundecanoic acid, nylon-12 obtained by the polycondensation of 12-aminododecanoic acid or of dodecanolactam, or nylon-6,12 obtained by the poycondensation of hexamethylenediamine with 1,12-dodecanedioic acid.

16. A light-scattering shaped article formed from the composition according to claim 1 by extrusion moulding, injection moulding, compression moulding or by casting.

17. An article according to claim 16, shaped in the form of a panel.

18. An article according to claim 17, comprising a concentration of polyamide particles varying over the entire thickness of the article, the highest concentration being in a region close to the scattering surface.

19. A light-scattering shaped article comprising a support made of a transparent thermoplastic material produced from a layer of a composition according to claim 1.

20. An article according to claim 19, in which the support made of transparent thermoplastic material is a (meth) acrylic (co)polymer, polycarbonate, polystyrene, polyethylene terephthalate or a copolyester consisting of polyethylene terephthalate modified by a glycol or a blend of polyethylene terephthalate and copolyester.

21. An article according to claim 19, obtained by coextrusion or by coating with acrylic resin.

22. A light-display system comprising a panel according to claim 17 and at least one light source.

23. System according to claim 22, comprising at least one means forming an elongate light source mounted in order to illuminate the panel via its edge.

24. A light-display system according to claim 22, comprising a panel carrying a light-scattering film or sheet on the face via which the scattered light is observed.

25. A light-display system according to claim 22, comprising a panel carrying an opaque film or sheet on the face opposite that via which the scattered light is observed.

26. A light-display system according to claim 24, wherein the light-scattering film and/or the opaque film are/is in the form of parallel adhesive strips, optionally uniformly spaced apart.

27. A system according to claim 26, wherein the film is in the form of adhesive strips which are parallel to each other and to the one or more elongate light sources mounted in order to illuminate the pane via it edge.

28. A composition according to claim 8 wherein the average size is between 0.4 and 50 microns.

29. A composition according to claim 4, wherein the alkyl methacrylate has from 1 to 8 carbon atoms in the alkyl group.

30. A composition according to claim 5, wherein the alkyl methacrylate has from 1 to 8 atoms in alkyl group.

31. A composition according to claim 2, wherein the polyamide particles have an average size of between 0.4 µm and 100 µm.

32. A composition according to claim 3, wherein the polyamide particles have an average size of between 0.4 µm and 100 µm.

33. A composition according to claim 2, comprising from 100 to 200 ppm of polyamide particles.

34. A composition according to claim 3, comprising from 100 to 200 ppm of polyamide particles.

35. A composition according to claim 2, comprising polyamide particles having a narrow particle size distribution, such that more than approximately 90% have a size between 2.5 and 10 microns.

36. A composition according to claim 3, comprising polyamide particle having a narrow particle size distribution, such that more than approximately 90% have a size between 2.5 and 10 microns.

37. A composition according to claim 2, wherein the polyamide is obtained from one or more lactams, one or more amino acids or mixtures of diamines and of diacids or from a mixture of these monomers.

38. A composition according to claim 3, wherein the polyamide is obtained from one or more lactams, one or more acids or mixtures of diamines and of diacids or from a mixture of these monomers.

* * * * *